United States Patent [19]

Rodriqguez

[11] Patent Number: 4,802,666

[45] Date of Patent: Feb. 7, 1989

[54] BICYCLE SUPPORT APPARATUS

[76] Inventor: Michael Rodriqguez, 2499 Kapiolani Blvd., Apt. 3100, Honolulu, Hi. 96826

[21] Appl. No.: 82,312

[22] Filed: Aug. 6, 1987

[51] Int. Cl.⁴ .............................................. A63B 69/16
[52] U.S. Cl. ...................................... 272/73; 434/247; 280/293
[58] Field of Search .......................... 272/73; 434/247; 280/293

[56] References Cited

U.S. PATENT DOCUMENTS

| 2,498,047 | 2/1950 | Myers | 272/73 |
| 4,026,546 | 5/1977 | Omori | 272/73.1 |
| 4,415,152 | 11/1983 | Smith | 272/73 |

FOREIGN PATENT DOCUMENTS

| 3243837 | 5/1984 | Fed. Rep. of Germany | 272/73 |
| 3411434 | 10/1985 | Fed. Rep. of Germany | 272/73.1 |
| 918470 | 10/1946 | France | 272/73 |
| 2394309 | 2/1979 | France | 272/73 |
| 19028 | 10/1894 | United Kingdom | 272/73 |

OTHER PUBLICATIONS

Performance Bicycle Shop Catalogue, Summer 1985.

*Primary Examiner*—Richard J. Apley
*Assistant Examiner*—S. R. Crow
*Attorney, Agent, or Firm*—Kolish, Hartwell & Dickinson

[57] ABSTRACT

Bicycle support apparatus including a front wheel support assembly and a rear wheel support assembly interconnected by strut structure. The rear wheel support assembly includes front and rear rollers that cradle the rear wheel, and intermediate rollers providing support for the rear wheel. The front wheel support assembly includes spaced rollers that cradle the front wheel.

4 Claims, 1 Drawing Sheet

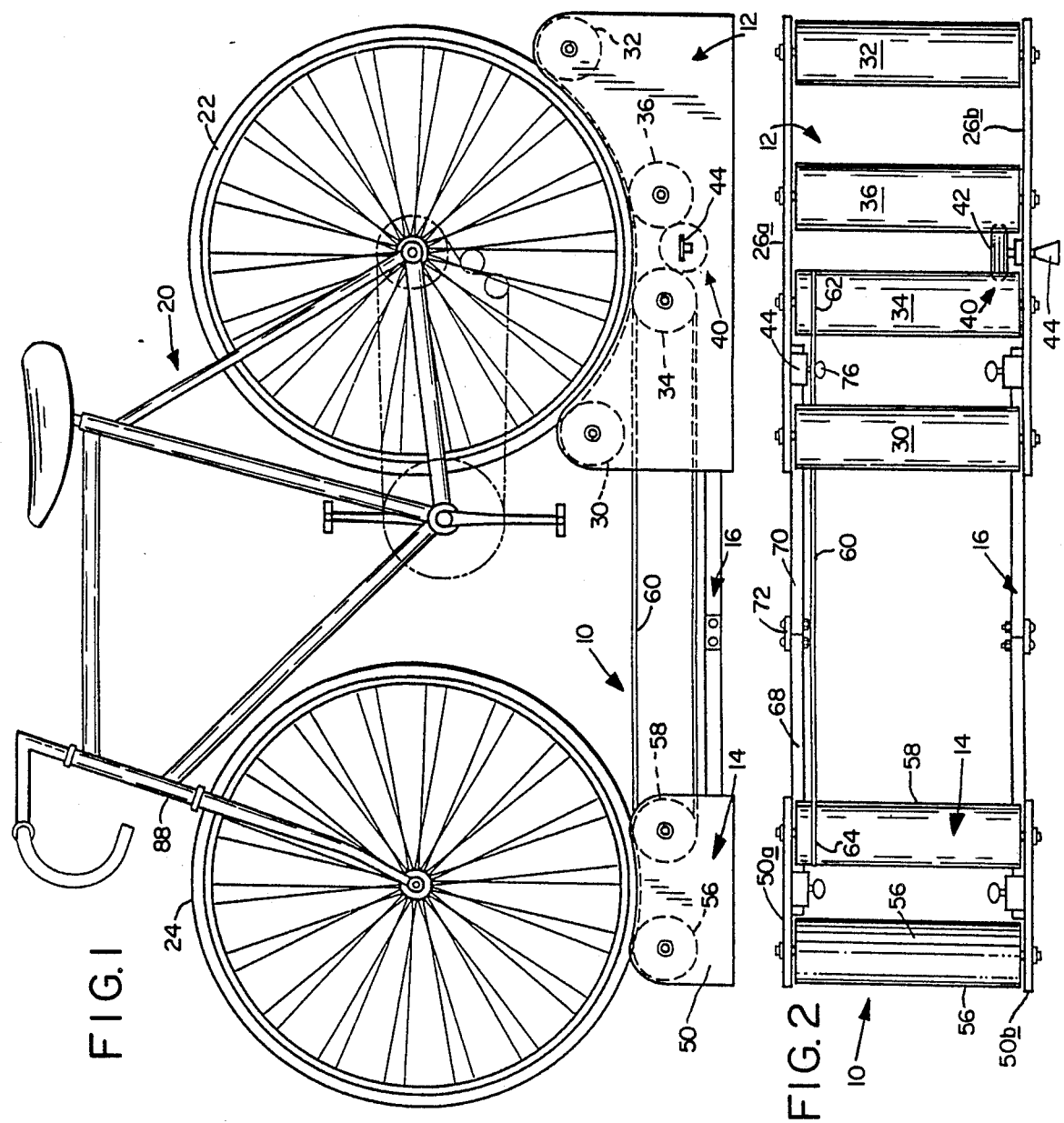
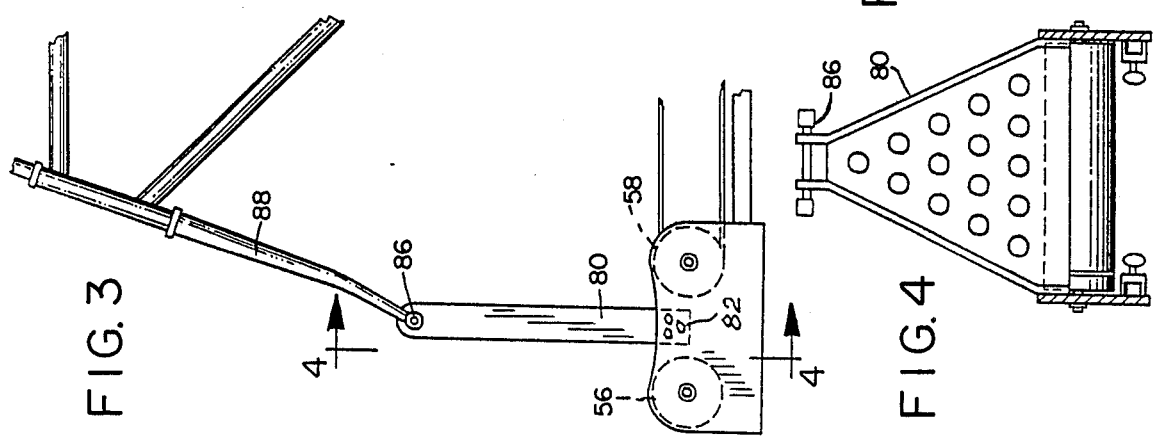

BICYCLE SUPPORT APPARATUS

BACKGROUND AND SUMARY OF THE INVENTION

This invention relates to a bicycle support apparatus, and more particularly to one which provides for the static use of a bicycle for purposes of training, conditioning, etc.

A particular object and feature of the present invention is the provision of a bicycle support for supporting an assembled bicycle, with rollers in the support apparatus supporting and engaging the front and rear wheels of the bicycle in a manner which enables the bicycle to be used in much the same manner as were the bicycle on an open road or track. The rollers in the apparatus support the front and rear bicycle wheels with both rotating during pedaling by the bicycle user. Thus, the apparatus may be employed by a bicyclist with the bicyclist in a stationary location under conditions closely simulating conditions of bicycle usage over the open terrain.

According to a preferred embodiment of the invention, the bicycle support apparatus further includes a detachable mount which is part of a front wheel support assembly detachably secured to a frame in the front wheel support assembly and constructed to provide support for the fork in a bicycle which mounts its front wheel. With the front wheel removed and the fork secured to the mount, the bicycle may be used with the bicycle frame and rear wheel in a more stabilized position than when the bicycle is supported through its front wheel on rollers in the front wheel support assembly. A bicyclist using the apparatus thus is permitted initially to train with the front wheel of the bicycle removed, and a transition is provided for further training with the front wheel in place on the bicycle and with the bicycle otherwise unsupported then through its wheels.

The rear wheel of a bicycle is the driven wheel, with the wheel during pedaling by the bicyclist ordinarily being subjected to a somewhat pulsating type of driving torque as the result of operating the bicycle pedals. The rear wheel support assembly in the apparatus of the invention is constructed in such a manner as to prevent the rear wheel from inadvertently leaping out of its cradled support during pedaling, and further in such a manner as to prevent the rear wheel from twisting or otherwise becoming misshaped from a condition of true roundness occupying a plane.

These and other objects and advantages are obtained by the invention, which is described here and below in conjunction with the accompanying drawings, wherein:

FIG. 1 illustrates bicycle support apparatus as contemplated with a bicycle supported thereon;

FIG. 2 is a plan view of the support apparatus shown in FIG. 1;

FIG. 3 illustrates the front portion of the apparatus with a detachable mount mounted in place and supporting the steering fork of a bicycle; and FIG. 4 is a view of the mount, taken generally along the line 4—4 in FIG. 3.

Referring now to the drawings, the bicycle support apparatus is indicated generally at 10 and includes a rear wheel support assembly shown generally at 12 and a front wheel support assembly shown generally at 14. The two wheel support assemblies are fixed at a predetermined distance apart through an interconnecting adjustable strut means indicated generally at 16.

Shown supported in an assembled state on the apparatus is a bicycle 20 having a driven rear wheel 22 supported by rear wheel support assembly 12 and its steerable front wheel 24 supported by front wheel assembly 14.

The rear wheel support assembly includes a frame 26 formed of opposed upstanding frame members 26a and 26b. Extending between and journaled in these frame members are multiple rollers, including what is referred to herein as a front roller 30, a rear roller 32, and intermediate rollers 34, 36. These rollers are rotatable about horizontal parallel axes extending transversely of the frame members.

With the rear wheel such as wheel 22 of bicycle 20 positioned above these rollers, the front and rear rollers, which engage the bicycle wheel at points typically spaced about 20 degrees or more about its circumference, serve to cradle the wheel, effectively preventing the wheel from jumping out of its seated position with the wheel rotated in response to pedaling of the bicycle. With a bicycle wheel, particularly one of the type used by racers and other competitors, being of light mass and finely engineered, it is important that additional support be provided the wheel to prevent inadvertent damage to the wheel such as twisting or other deformation out of true round. The intermediate rollers perform this function, such being spaced closely adjacent to each other at a level below the front and rear rollers and interacting to provide basic support for the wheel.

A brake shown generally at 40 is provided which may be actuated to provide resistance to rotation of the intermediate rollers. Such includes a roller 42 surfaced with elastomer material operatively connected to a pedal 44 whereby with the pedal depressed the roller is forced into greater and greater contact with rollers 34, 36, thus to offer increased resistance to free rotational movement. Suitable releasable means is provided for holding pedal 44 in different adjusted positions (not shown).

The front wheel support assembly includes a frame 50 made up of frame members 50a, 50b, disposed on opposite sides of the assembly, rotatably mounting front and rear rollers 56, 58, which rotate about parallel axes. These rollers cradle, by receiving therebetween, the lower portions of front wheel 24 of the bicycle.

In order to impart rotation to the front wheel of the bicycle with the apparatus used for training purposes, an intermediate roller 34 is operatively connected to one of the rollers in the front wheel support assembly, i.e., roller 58, by an elongate continuous cord-type belt 60. Annular grooves 62, 64 in rollers 34, 58 train the belt.

Strut means 16 extending between the front and rear wheel support assemblies may comprise on each side of the apparatus a pair of bar segments 68, 70 set end to end and interconnected at adjacent set of ends by fastener means 72. The remote ends of the bar segments are slidably and adjustably mounted in a socket such as the socket 74 shown in the rear wheel assembly fastener such as the thumb screw 76 is provided for adjustably clamping onto a bar segment with the bar segment occupying the desired position within a socket 74.

With the apparatus described, the cyclist may place his bicycle in its assembled state on the apparatus with front and rear wheels supported by assemblies 14, 12. On pedaling the bicycle, the rollers in the rear wheel assembly rotate against any resistance provided by brake means 40. The rollers in the front wheel assembly rotate to cause rotation of the front wheel in the bicycle. The cyclist, therefore, is enabled to pedal the bicycle and maintain balance in much the same manner as were the bicycle used on open terrain.

As illustrated in FIGS. 3 and 4, the apparatus contemplated further includes a detachable mount 80 which is detachably secured in place on the front wheel assembly with fasteners 82 in a region located between the front and rear rollers 56, 58. The mount has a substantially triangular outline viewing the face of the mount as shown in FIG. 4, and thus terminates at an apex disposed above the rollers approximately midway between side frame members 50a, 50b. Means 86 is provided on this apex for receiving and mounting the lower extremities of fork 88 in bicycle 20 which normally mounts the front wheel of the bicycle. To mount the fork on the mount, the front wheel is first removed.

In using the apparatus with mount 80, a greater amount of stability is provided the cyclist then when using the apparatus as illustrated in FIG. 1. Thus, the cyclist can use the apparatus in a transitional mode, and with the mount included, and after gaining experience remove the mount and use the apparatus with such supporting the bicycle only through supporting its wheels.

The apparatus contemplated is a very valuable tool for training professionals. It is easily broken down and transported from place to place. Maintenance is minimal.

While a preferred embodiment of the invention has been described, obviously variations and modifications are possible.

It is claimed and desired to secure by Letters Patent:

1. A bicycle support for supporting through its wheels an assembled bicycle for non-traveling, exercise use of the bicycle comprising:
   a front wheel support assembly including a frame and at least a pair of laterally spaced rollers journaled on said frame for rotation about parallel axes, the rollers having wheel-engaging surfaces and the surfaces of the rollers lying in a first circular arc, the rollers being constructed and arranged to provide for cradled support therebetween of the front wheel of the bicycle,
   a rear wheel support assembly including a frame and multiple laterally spaced rollers journaled on said frame for rotation about parallel axes, the rollers of the rear wheel support assembly having wheel-engaging surfaces and these surfaces lying in a second circular arc having the same radius as said first circular arc, said rollers of the rear wheel support assembly including a front roller and rear roller and at least an intermediate roller between the front and rear rollers, the front and rear rollers being constructed and arranged to provide for cradled support therebetween of the rear wheel of a bicycle and the intermediate roller providing a bottoming support between the cradled support for the rear wheel, the surfaces of said front and rear rollers being angularly spaced in said second circular arc a greater angular distance than the angular spacing of the surfaces of the rollers in the front wheel assembly in said first circular arc, belt means interconnecting the intermediate roller in the rear wheel support assembly with a roller in the front wheel support assembly whereby rotation is imparted from the intermediate roller to the roller in the front wheel support assembly, and
   means fixing the front and rear wheel assemblies at a predetermined distance apart and with the assemblies aligned in a direction extending transversely of their respective rollers.

2. The bicycle support of claim 1, wherein the rear wheel support assembly includes another intermediate roller paralleling and closely adjacent and disposed at the same level as the first-mentioned intermediate roller, the said other and first-mentioned intermediate rollers cooperatively providing spaced support for the rear bicycle wheel and the front and rear rollers preventing the rear wheel of the bicycle from moving off the intermediate rollers during pedaling by the bicycle user.

3. A bicycle support for supporting a bicycle for non-traveling, exercise use of the bicycle comprising:
   a rear wheel support assembly including a frame and multiple laterally spaced rollers journaled on said frame for rotation about parallel axes, the rollers having wheel-engaging surfaces and the surfaces lying in a circular arc,
   said rollers including a front roller and rear roller and at least an intermediate roller between the front and rear rollers and between the level of the front and rear rollers, the front and rear rollers providing cradled support therebetween of the rear wheel of a bicycle and the intermediate roller providing a bottoming support between the front and rear rollers for the rear bicycle wheel,
   a front wheel support assembly including a frame and at least a pair of laterally spaced rollers journaled on said frame for rotation about parallel axes, the rollers of the front wheel assembly having wheel-engaging surfaces and the surfaces lying in a second circular arc having the same radius as said first circular arc, the rollers having a position providing for cradled support therebetween of the front wheel of a bicycle, the surfaces of said front and rear rollers in the rear wheel support assembly being angularly spaced in said first circular arc a greater angular distance than the angular spacing of the surfaces of the rollers in the front wheel support assembly in said second circular arc,
   belt means interconnecting the intermediate roller in the rear wheel support assembly with a roller in the front wheel support assembly whereby rotation is imparted from the intermediate roller to the roller in the front wheel support assembly,
   a detachable mount assembly detachably secured to the frame of the front wheel support assembly extending upwardly from the frame above said rollers to an apex which is located essentially midway between the ends of the rollers in the front wheel support assembly, means on said apex for mounting the front wheel fork of a bicycle, and
   means fixing the front and rear wheel support assemblies at a predetermined distance apart and with the two assemblies aligned in a direction extending transversely of the rollers in their respective assemblies.

4. The bicycle support of claim 3, wherein said detachable mount is detachably secured to said frame at a location disposed intermediate said laterally spaced rollers in the front wheel support.

* * * * *